Figure 1:
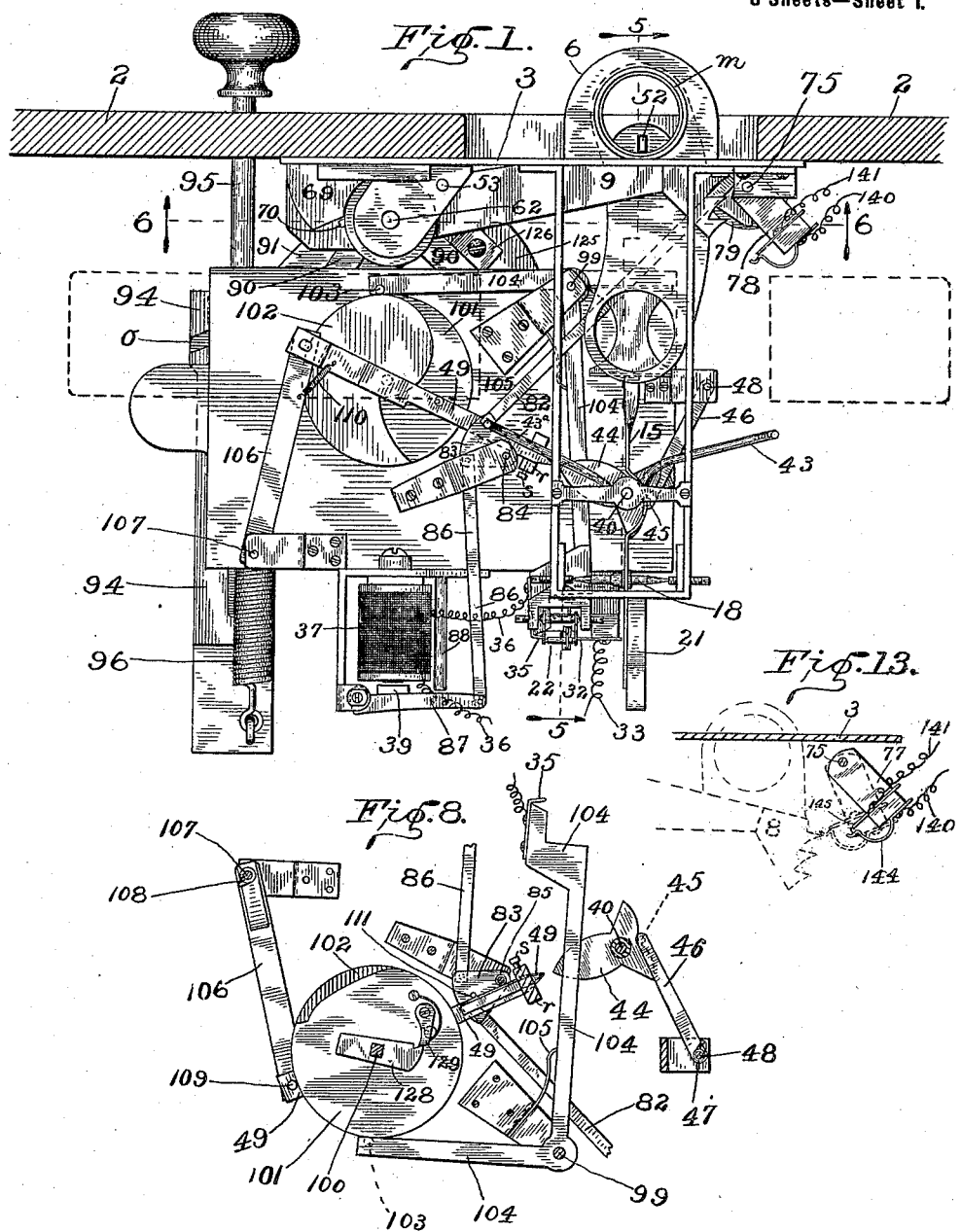

No. 688,839. Patented Dec. 17, 1901.
J. E. EVARD.
APPARATUS FOR DISTINGUISHING GENUINE FROM SPURIOUS COINS.
(Application filed May 18, 1901.)
(No Model.) 8 Sheets—Sheet 1.

WITNESSES:
C. S. Fry
J. H. Colvin

INVENTOR
John E. Evard,
BY
Chester Bradford,
ATTORNEY

No. 688,839. Patented Dec. 17, 1901.
J. E. EVARD.
APPARATUS FOR DISTINGUISHING GENUINE FROM SPURIOUS COINS.
(Application filed May 18, 1901.)
(No Model.) 8 Sheets—Sheet 2.

WITNESSES:
C. S. Frye.
T. H. Colvin.

INVENTOR
John E. Evard,
BY
Chester F. Bradford,
ATTORNEY

No. 688,839. Patented Dec. 17, 1901.
J. E. EVARD.
APPARATUS FOR DISTINGUISHING GENUINE FROM SPURIOUS COINS.
(Application filed May 18, 1901.)
(No Model.)
8 Sheets—Sheet 4.
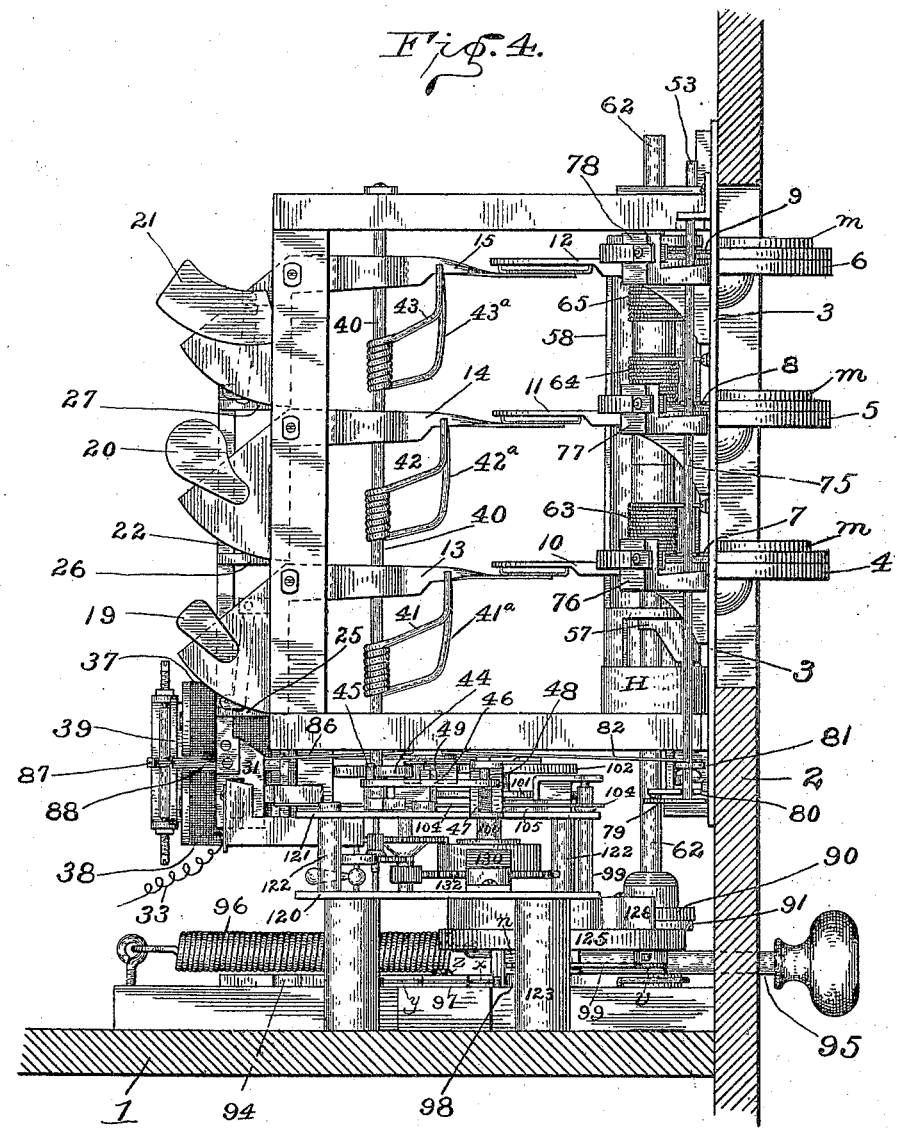
WITNESSES:
C. S. Frye.
T. H. Colvin.
INVENTOR
John E. Evard,
BY
Chester Bradford,
ATTORNEY No. 688,839. Patented Dec. 17, 1901.
J. E. EVARD.
APPARATUS FOR DISTINGUISHING GENUINE FROM SPURIOUS COINS.
(Application filed May 18, 1901.)
(No Model.) 8 Sheets—Sheet 5.
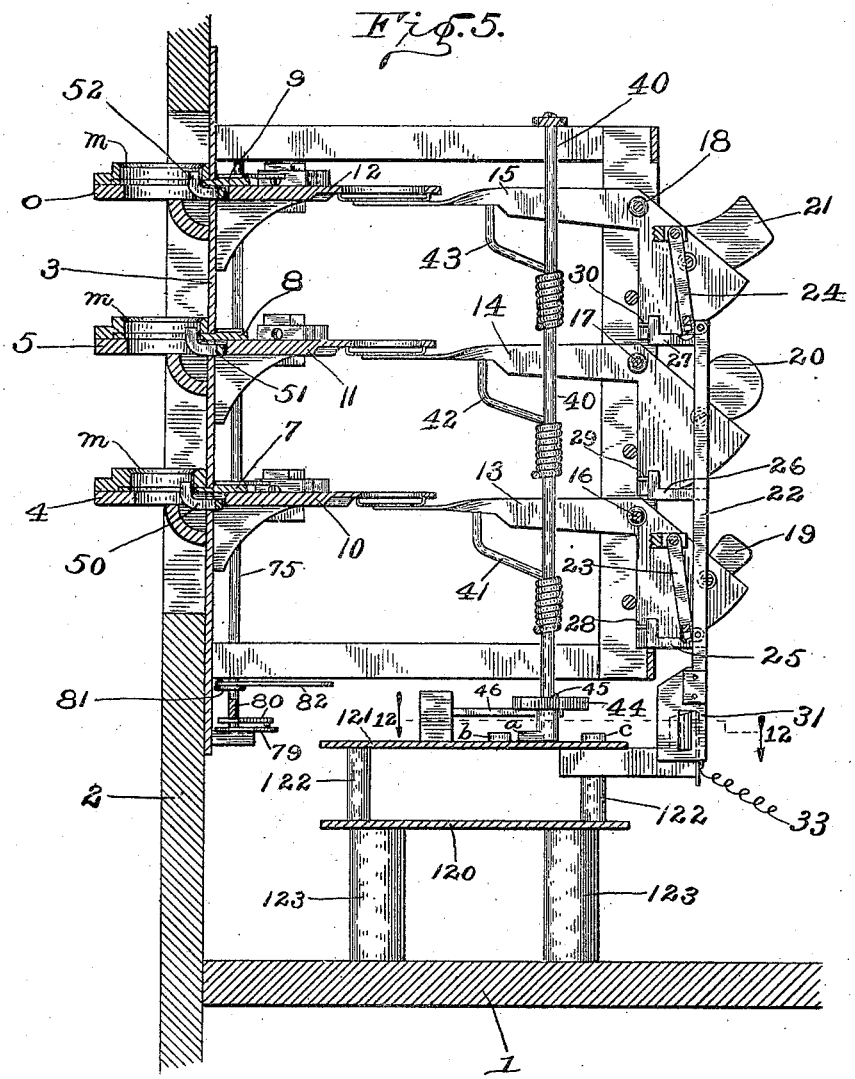
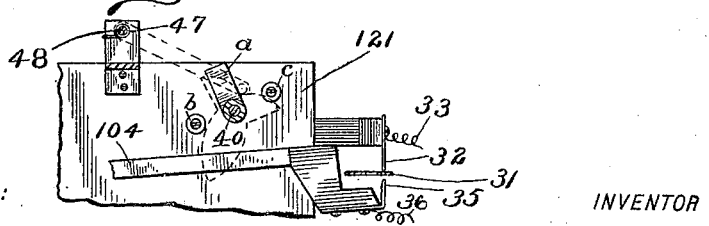
WITNESSES: INVENTOR
John E. Evard,
BY
Chester Bradford,
ATTORNEY
THE NORRIS PETERS CO., PHOTO-LITHO., WASHINGTON, D. C.

No. 688,839. Patented Dec. 17, 1901.
J. E. EVARD.
APPARATUS FOR DISTINGUISHING GENUINE FROM SPURIOUS COINS.
(Application filed May 18, 1901.)
(No Model.) 8 Sheets—Sheet 6.
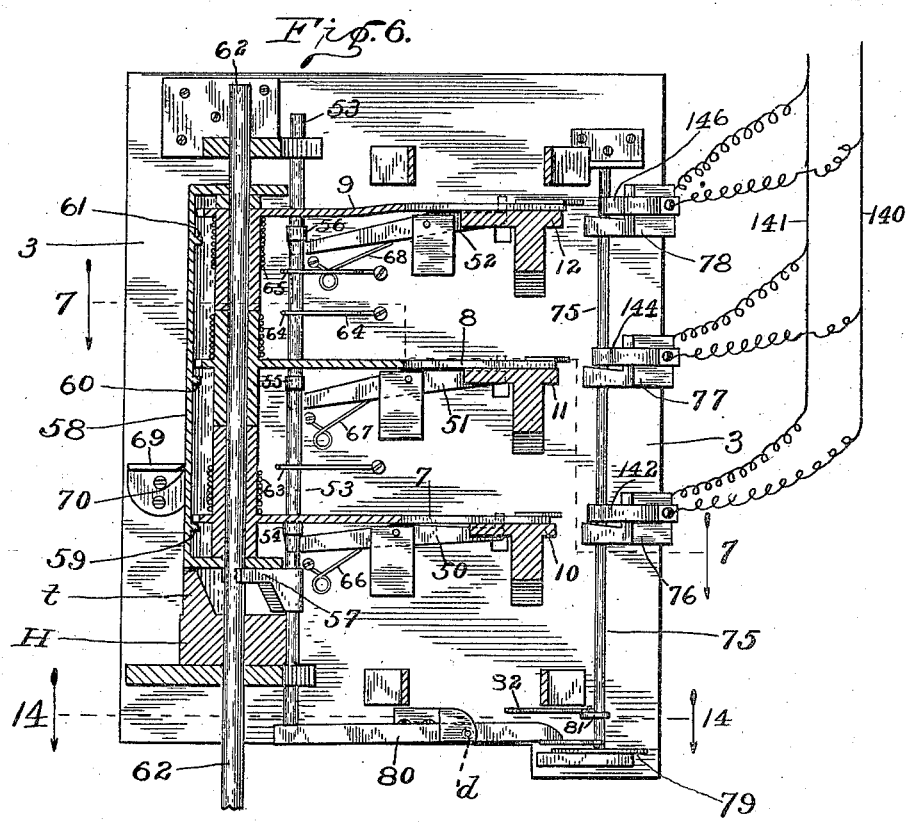
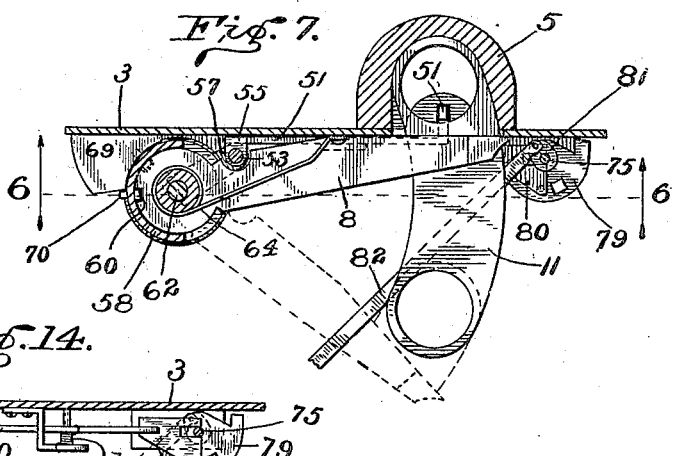
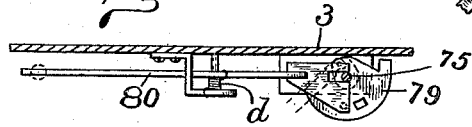
WITNESSES:
C. S. Frye
J. H. Colvin
INVENTOR
John E. Evard,
BY
Chester Bradford,
ATTORNEY No. 688,839. Patented Dec. 17, 1901.
J. E. EVARD.
APPARATUS FOR DISTINGUISHING GENUINE FROM SPURIOUS COINS.
(Application filed May 18, 1901.)
(No Model.) 8 Sheets—Sheet 7.
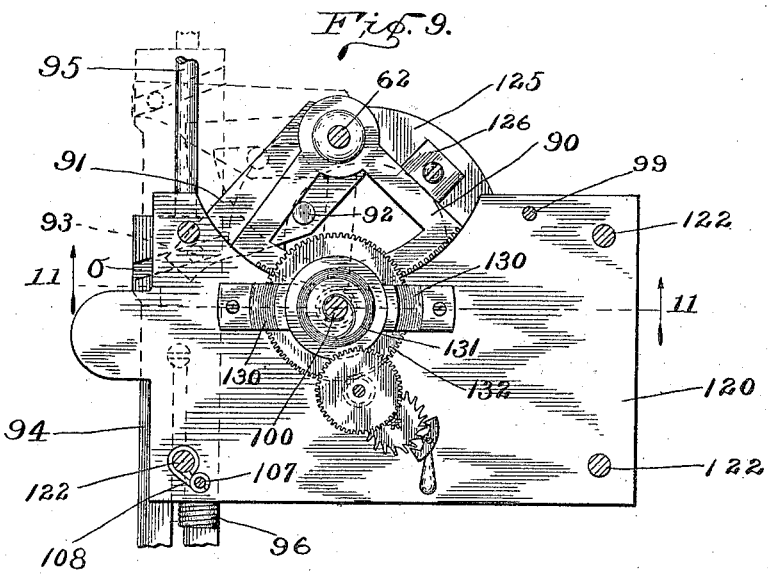

No. 688,839. Patented Dec. 17, 1901.
J. E. EVARD.
APPARATUS FOR DISTINGUISHING GENUINE FROM SPURIOUS COINS.
(Application filed May 18, 1901.)
(No Model.) 8 Sheets—Sheet 8.
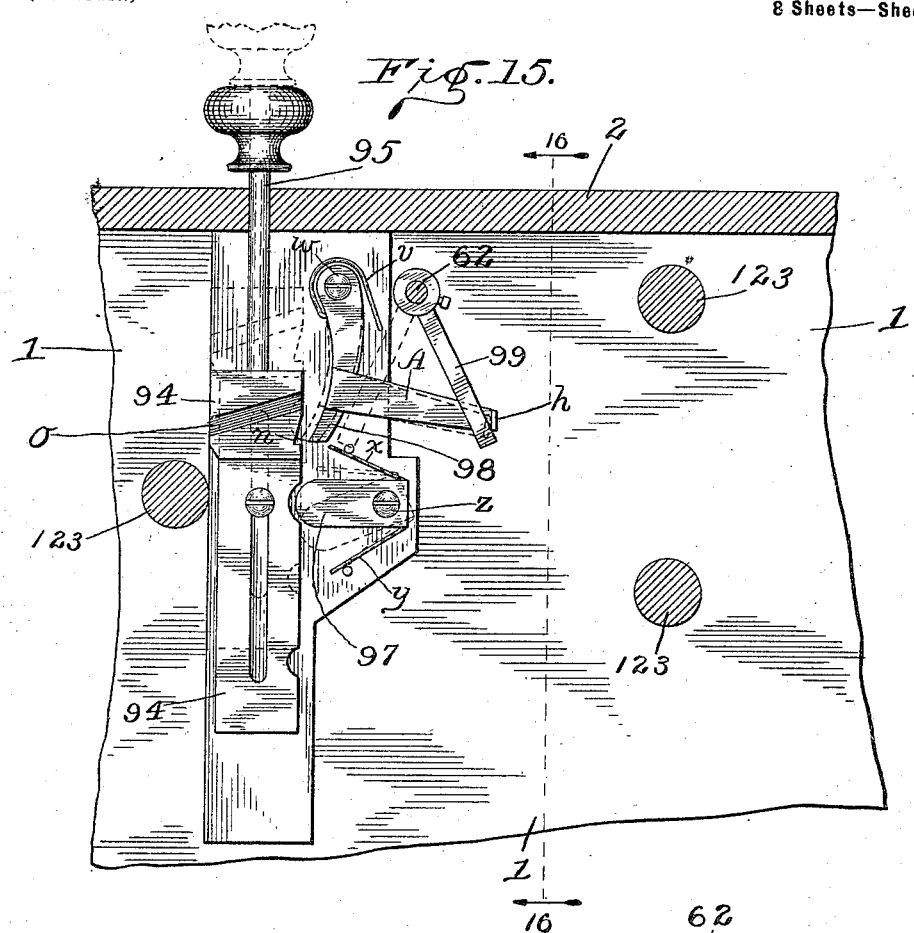
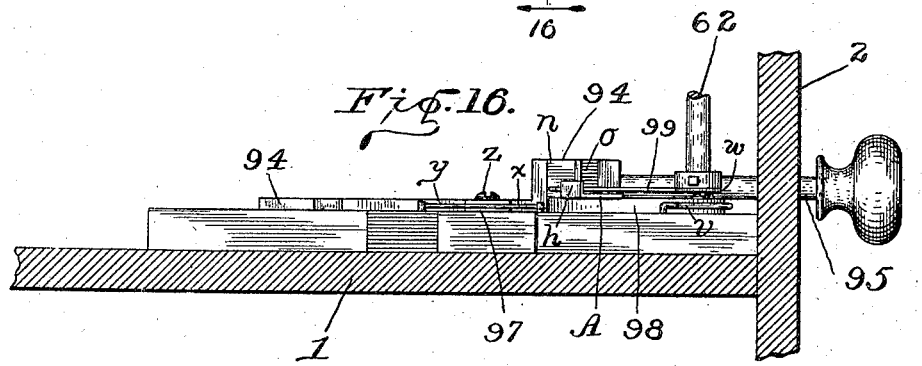
WITNESSES:
C. S. Fry.
T. H. Colvin
INVENTOR
John E. Evard,
BY
Chester Bradford,
ATTORNEY

UNITED STATES PATENT OFFICE.

JOHN E. EVARD, OF INDIANAPOLIS, INDIANA, ASSIGNOR OF ONE-HALF TO ARTHUR A. McKAIN, OF INDIANAPOLIS, INDIANA.

APPARATUS FOR DISTINGUISHING GENUINE FROM SPURIOUS COINS.

SPECIFICATION forming part of Letters Patent No. 688,839, dated December 17, 1901.

Application filed May 18, 1901. Serial No. 60,954. (No model.)

*To all whom it may concern:*

Be it known that I, JOHN E. EVARD, a citizen of the United States, residing at Indianapolis, in the county of Marion and State of Indiana, have invented certain new and useful Improvements in Apparatus for Distinguishing Genuine from Spurious Coins at Automatic Pay-Stations, of which the following is a specification.

Apparatus used in automatically-acting pay-stations for telephones and for such like purposes has been subject to the disadvantage that no practical means existed for the separation of spurious or uncurrent from genuine coins, it being obviously impossible for the telephone operator at the exchange to know the character of the coins inserted at the talking station or instrument.

Genuine coins usually differ perceptibly in weight from those which are spurious or counterfeit, the specific gravity of the metal of which coins are composed being different from the specific gravity of pieces of base metal of corresponding diameter and thickness. Based upon these facts, the object of my present invention is to produce an apparatus for use at automatic telephone pay-stations and in such like places which will reject or throw out spurious, counterfeit, or uncurrent coins or anything which is heavier or lighter than genuine coin, while accepting that which is genuine, and consequently of proper weight.

In describing this machine I will for the most part describe its operation when used in ordinary local service, wherein a five-cent piece, or "nickel," is the coin commonly used, and I will illustrate the different operations when a genuine nickel is used and when a piece of brass and also when a piece of lead is attempted to be substituted for such genuine coin or nickel, a piece of brass of corresponding thickness and diameter being lighter than the genuine metal and a piece of lead of corresponding thickness and diameter being heavier. A machine for the purpose, however, must of course be adapted to take coins of various sizes, for the reason that an automatic pay-station must be adapted to receive sums of varying amounts in order to accommodate long-distance talking. I have chosen to illustrate a machine adapted to be used with three denominations of coin only—viz., dimes, nickels, and quarters; but of course it may be extended to cover all the usual denominations. The number shown, however, is quite sufficient for purposes of illustration and to illustrate more would only be to multiply parts, and consequently to add to the intricacy of the apparatus shown without adding anything to clearness of presentation of the invention.

Figure 2:
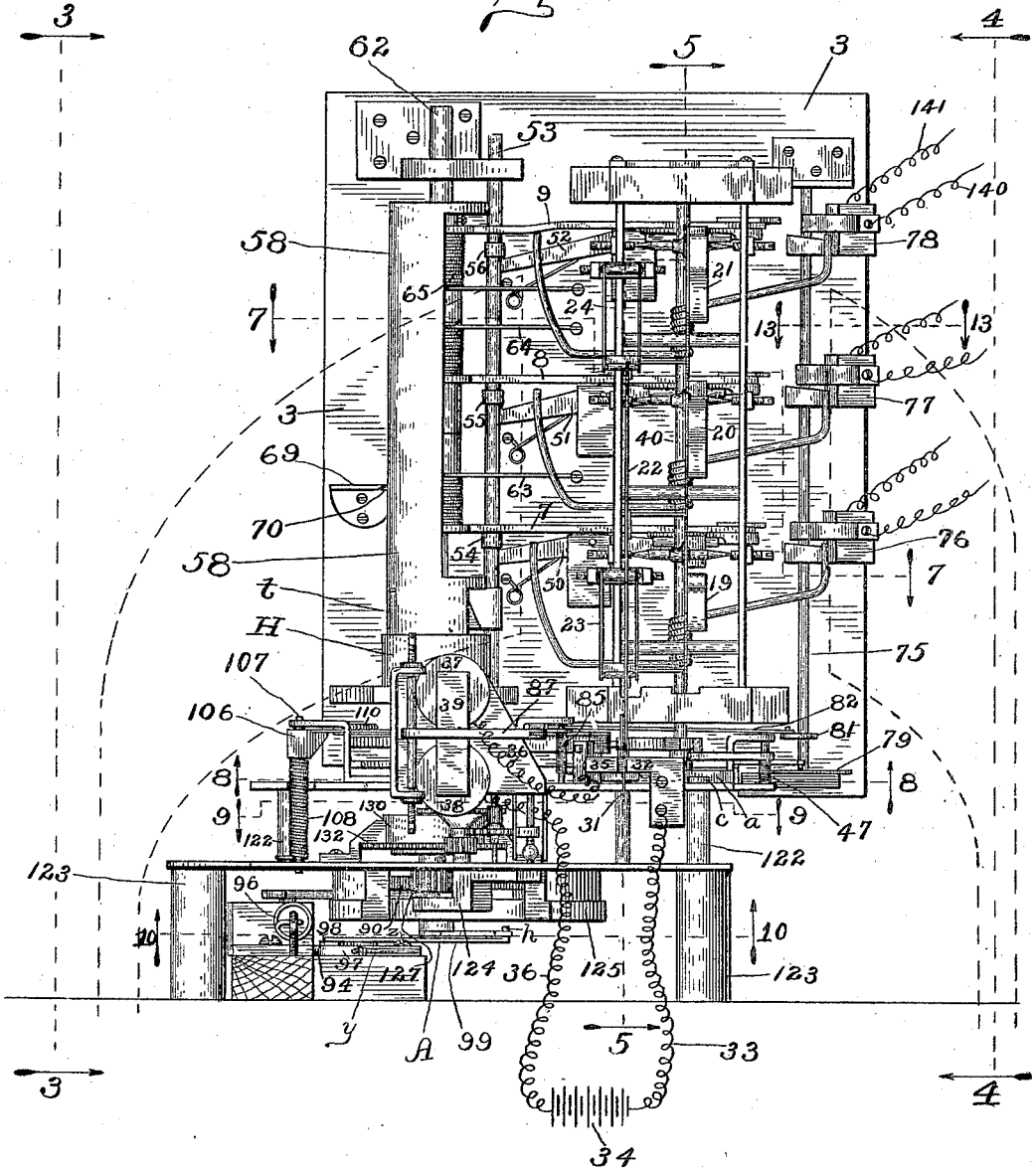
Figure 3:
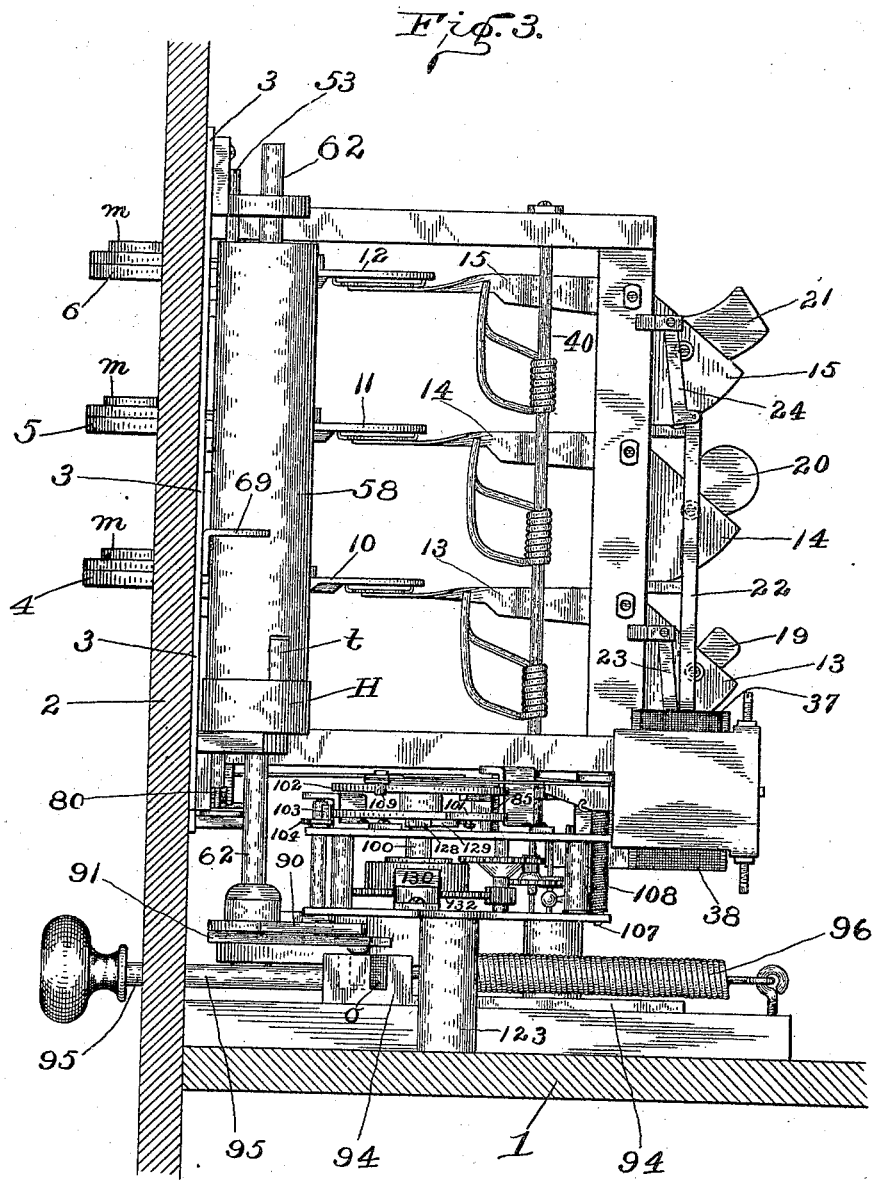

Referring to the accompanying drawings, which are made a part hereof, and on which similar reference characters indicate corresponding parts, Figure 1 is a top or plan view of an apparatus embodying my present invention; Fig. 2, a front elevation of the same; Fig. 3, a side elevation as seen when looking in the direction indicated by the arrows from the dotted line 3 3 alongside said Fig. 2; Fig. 4, a side elevation of the other side as seen when looking in the direction indicated by the arrows from the dotted line 4 4 alongside Fig. 2; Fig. 5, a vertical sectional view as seen when looking in the direction indicated by the arrows from the dotted line 5 5 in Fig. 2; Fig. 6, a vertical sectional view as seen when looking in the direction indicated by the arrows from the dotted line 6 6 in Fig. 1; Fig. 7, a horizontal sectional view taken immediately above the nickel-carrying slide and showing the parts immediately below the dotted line 7 7 in Figs. 2 and 6 and also showing by means of dotted lines the innermost position of the swinging arm 8, which is one of said parts; Fig. 8, an under side plan view showing the parts immediately above as seen when looking upwardly from the dotted line 8 8 in Fig. 2; Fig. 9, a horizontal sectional view looking downwardly from the dotted line 9 9 in Fig. 2; Fig. 10, an under side plan view as seen when looking upwardly from the dotted line 10 10 in Fig. 2; Fig. 11, a vertical sectional view of a portion of the lower mechanism as seen when looking in the direction indicated by the arrows from the dotted line 11 11 in Fig. 9; Fig. 12, a detail horizontal sectional view as seen when looking downwardly from the dotted line 12 12 in Fig. 5; Fig. 13, a detail horizontal sectional view as seen when looking downwardly from the dotted line 13 13 in Fig. 2; Fig. 14, a detail horizontal sectional view as seen when looking downwardly from the dotted line 14 14 in Fig. 6; Fig. 15, a plan view looking downwardly from the dotted line 10 10 in Fig. 2, showing the pull-rod by which the apparatus is set in motion and the locking and governing devices by which its movement is controlled in the at-rest position, its extreme pulled-out position being indicated by means of dotted lines; and Fig. 16, a view showing the same parts in side elevation, the view-point being at the dotted line 16 16 in said Fig. 15.

This apparatus may obviously be secured within any suitable casing or framework, and I have not attempted to show any such casing in full, but have simply in certain of the views shown a fragment of a floor 1, on which the bottom portion of the apparatus rests, and a portion of a single wall 2, to which one side of the upright portion of the apparatus is secured, while in other of the views no inclosing casing or framework is shown at all, but only the frame of the apparatus proper.

The coin-receiving portion of this apparatus is arranged in vertical or upright position, and the plate 3, to which a considerable portion of the mechanism is secured, is adapted to be carried by the wall 2. Upon the outside of the structure are the primary coin-receivers 4, 5, and 6, which are rigidly secured to the plate 3. The introducing portions or mouths $m$ of said receivers are of the exact diameter of the coin to be handled thereby, while the lower portions are of somewhat less diameter, so that a coin of the proper size when introduced into either of these mouths will rest on the edge formed by the slightly-smaller lower portion, as is illustrated in the sectional view, Fig. 5. The coin-carrier is in the form of a swinging arm, and its outer end, which immediately receives the coins, passes out into the coin-receiving structure just below its mouth into a space formed to receive it between its upper and its lower portions. This coin-carrier has a mouth or opening of exactly the same diameter as the diameter of the mouth $m$, below which it passes, and when this is in position the coin introduced passes down through the mouth $m$ and into the opening in the coin-carrying arm. There are as many of these coin-carrying arms as there are different denominations of coin provided for in the apparatus, and I have shown the apparatus adapted to receive three, as above stated, and consequently there are illustrated three arms 7, 8, and 9. These are adapted to be driven back and forth in carrying the coin into the machine and in returning into position, as will be presently described. In passing into the machine they pass over stationary slideways 10, 11, and 12, respectively, which at their inner ends have openings corresponding to the coin-receiving openings in said swinging arms, with which the latter register when they reach their extreme inner position and through which the coins will then drop onto the receiving-plate of the corresponding coin-receiving balances 13, 14, and 15. These are respectively carried by the pivots 16, 17, and 18, and beyond said pivots are counterbalancing-weights 19, 20, and 21, which are made adjustable, as will be presently described. These balances are so arranged as that when a genuine coin is delivered it will move it to the predetermined point to cause the apparatus to work in one direction, as will be presently described. If the coin is too light, the movement stops short of the predetermined point, and if it is too heavy the movement is carried beyond the predetermined point, and in either event the result is to reject and throw out the coin, while when the apparatus stops at exactly the right point it will select and receive the coin. This last result is accomplished in the following manner: A swinging bar 22 is carried both at the bottom and at the top upon double swinging links 23 and 24, so that in its movement in and out it maintains a vertical position parallel to its original position. On this bar 22 are three extensions 25, 26, and 27, which are respectively adapted to come in contact with projections 28, 29, and 30 on the adjacent portions of the coin-receiving balances 13, 14, and 15, respectively. The consequence is that when either of said coin-receiving balances is depressed by the weight of the coin coming upon it the bar 22 is swung outwardly a distance proportionate to the weight of the coin, and if the coin is spurious or counterfeit, and consequently of less or greater weight than a genuine coin, the distance to which the bar will be swung is correspondingly greater or less than when a genuine coin is used.

Upon the lower end of the bar 22 is a plate of non-conducting material 31, and through this plate is a suitably-arranged opening. On one side of this non-conducting plate 31 is the terminal 32 of the wire 33, leading from the battery 34, and on the other side of said plate 31 is the terminal 35 of the wire 36, which wire leads through the spools 37 and 38 of a suitable magnet back to the other side of the battery 34. The terminal 33 is mechanically operated by means which will be hereinafter described at a certain point in the operation of the apparatus. If at this time the bar 22 has been swung to a point where the opening in the non-conducting plate 31 is exactly between these two terminals, the mechanical movement in question will operate to make contact between them, which will complete the electrical circuit and energize the magnet, the armature 39 of which is connected to certain other mechanism, as will be presently described, which is thus caused to move in one direction and select and retain the coin. If, however, the bar 22 has been swung either too far or not far enough, so that the non-conducting material is interposed between the contacts, preventing them from coming together, the circuit will not be completed nor the magnet energized, so that the mechanism in question is not operated in the manner stated, but operates in a different manner to reject and throw out the coin. Thus, as will be seen, the question of whether or not the coin will be accepted or rejected depends upon its weight, and the weighing mechanism is so delicately and accurately balanced that a very trifling variation from the predetermined weight will cause the rejection of the coin. Badly worn or mutilated coin will also be rejected by this machine, as well as spurious or counterfeit coin. The opening in the plate 31 is made of a size to govern the variation which is to be permitted, and the weights 19, 20, and 21 being adjustable are set to produce the exact result desired. When properly adjusted, a new coin of full weight will operate to move the insulating-plate 31 so far that the contacts will barely pass through the hole close to one side thereof, while slightly-worn coin will still permit the electrical contact, although not moving the insulating-plate quite so far. This matter can be regulated by adjusting the weights 19, 20, and 21 and the size of the hole in the plate 36; but when once established the adjustment will be permanently maintained and uniform results thus secured.

Standing in line with the bars of the balances which receive the coins is an upright shaft 40, upon which are a series of pairs of arms 41 41ª, 42 42ª, and 43 43ª, which pairs of arms are respectively adapted to be swung by said shaft toward the balances carrying the coin, striking the coin at the time on either of said balances upon one side or the other and throwing it off in a predetermined direction and into chutes or hoppers or other suitable receptacles—such as are shown, for example, by means of dotted lines in Figs. 1 and 2. This shaft is governed in its movements by a cam 44, mounted thereon and having three operative surfaces. One of these surfaces (which I will call the "rear" surface) has a depression at its central point, from which point said surfaces gradually rise in each direction.

A pin 45, carried by a swinging arm 46, rests against this surface and is held in forcible contact therewith by a spring 47, which is preferably attached to the shaft 48, on which the arm 46 is rigidly mounted. The effect of this is to hold the shaft 40 to a certain predetermined position at all times, except when moved from said position by the operation of the mechanism on the other side of the shaft 40 from where the pin 45 is positioned. The cam 44 is shaped something like a spear-head and runs to a point. Positioned directly opposite the point of the cam is a reciprocating bar 49, the point of which is adapted to be shifted sidewise slightly, so that as it moves forward in the manner which will be presently described it will strike said cam upon either side of this point, and thus cause the shaft 40 to swing in either direction, according to which side of the cam is thus operated upon. Said arm 49 passes through and is guided by a rest $r$, in which is a set-screw $s$, constituting an adjustable side against which the bar bears in operation and by means of which its movement may be accurately controlled. An arm $a$ is secured to the shaft 40 near its lower end and passes between stops $b$ and $c$ on the adjacent portion of the frame, and these limit the movement of the shaft and prevent the coin-ejecting arms thereon from being thrown into violent contact with the coin-carrying balances.

As before described, a genuine or current coin operates the coin-balances on which it falls to a certain point, while a spurious or uncurrent coin, owing to the difference in its weight from that of a genuine coin, will cause it to move to another point, and this controls the mechanism in question, so that the shaft 40 is driven to one side and accepts the coin in case it is genuine and is driven to the other side and rejects it in case it is spurious.

Returning now to the point of introduction of coins into the apparatus, when a coin is introduced in the mouth $m$ of one of the receiving structures, as 5, it comes in contact with the point of the lever which extends thereinto, as above shown in Fig. 5. These levers 50 51 52 extend from these mouths respectively to alongside a vertical rod 53 (see especially Fig. 6) and are arranged to engage with a corresponding projection on said rod. By means of said projections 54 55 56 said rod may be raised by either of said levers independently of the others, and it in turn by means of an arm 57 engages with and raises a multiplex clutch member 58.

The levers 50, 51, and 52 are, as best shown in Fig. 6, pivoted at various points along their length, so that each has a different throw from the others, and consequently each will raise the rod 53 to a different height than either of the others will. Upon one face of the multiplex clutch member 58 are three engaging points or teeth 59, 60, and 61. A shaft 62 passes through this clutch member centrally thereof, and upon said shaft are mounted the hubs of the three coin-carrying arms 7, 8, and 9. These hubs have flanges which extend to alongside the clutch member 58, and upon said part 58 as a means of engagment with said flanges are the projections or teeth 59, 60, and 61, previously mentioned. As clearly shown in Fig. 6, these projections are differently positioned relative to the flanges in question, so that but one will be in engagement with the notch formed to receive it in the corresponding flange at one time. The pivot-points or fulcrums of the levers 50, 51, and 52 being at different points, as stated, said levers when operated each raise the part 58 a different distance, and the parts are so operated that when the lever 50 is depressed the projection 59 will just engage with the notch in the flange on the hub of the arm 7, and when the lever 51 is depressed the projection 60 will just engage with the notch in the flange on the hub of the arm 8, and when the lever 52 is depressed the projection 61 will just engage with the notch in the flange on the hub of the arm 9, and in no case will more than one projection or notch be in engagement.

The clutch member 58 is so mounted on the shaft 62 as to be driven thereby while permitting a suitable longitudinal movement thereon. The means of engagement shown consists of a tongue $t$, extending up into a corresponding slot in the clutch member 58 from a hub H, which is rigidly secured to said shaft 62, as shown in Fig. 3. The clutch member must consequently revolve with the shaft when the latter is driven, as will be presently described, and this results in swinging whatever coin-carrying arm is in engagement therewith by means of the corresponding projections and notches whenever said shaft 62 is rotated.

The hubs of the arms 7, 8, and 9 are, as already indicated, loosely mounted on the shaft 62, but are each connected by means of a coil-spring to a suitably-fixed point. These springs 63, 64, and 65 are shown as coiled about the hubs and then carried off and connected at the ends to the back plate 3. Whatever coin-carrying arm is in engagement is driven, carrying the coin which has been introduced by the rotation of the shaft 62. After the coin-carrying arm has completed its movement and discharged the coin carried thereby and has fully returned to position the engagement between the hub of said arm and said clutch member 58 is released, and consequently said clutch member is permitted to drop and the arm, as 8, and the lever, as 51, are in their primary positions ready to receive another coin. The corresponding spring, as 64, has a tendency to aid the return of the coin-carrying arm; but its principal purpose is to hold said coin-carrying arm pressed against its stop, as plate 3, when the machine is not in operation, so that the notches in the flanges on the hubs of said coin-carrying arms will be kept certainly in line ready for engagement with the proper projections in the multiplex clutch member 58. As will be readily understood, after the parts have returned and the member 58 has dropped to its lower position the only force holding these arms to proper position is these springs, the driving mechanism being disconnected therewith.

Suitable springs 66, 67, and 68, secured to the plate 3 below the levers 50, 51, and 52, respectively, serve both to hold the ends of said levers into contact with the projections on the rod 53 and to support said rod (through said levers) when the clutch member 58 is raised and while supported by the projections provided for that purpose, as elsewhere explained. When, however, said part 58 has escaped from its supporting projections and descends to its lower position, it operates through the arm 57 on this rod 53 to pull down said rod and the levers which operate it, its added weight being sufficient to overcome the force of said springs.

In the operation of the multiplex clutch member 58 it is necessary that it should remain at the height to which it has been raised after it has been revolved in operation until it returns to its primary position. I provide for this at one position by means of a flange 69, which is secured to the back plate 3 and passes around close to the outside of said part 58 a proper distance. A projection 70 on said part 58 is arranged to be raised just above this flange, and as the said part is revolving to pass over above it and when the force on the lever is released to rest upon said flange until it has revolved back to a position where it will escape therefrom. This is only necessary at one point, however, as the projections inside the said part 58 and the flanges on the hubs of the arms serve the purpose stated at the other points—that is to say, when part 58 is raised by lever 50 the flange 69 and projection 70 serve the purpose. When the part 58 is raised by the lever 51, then the projection 59 and the flange on the arm 7 serve the purpose, and when the said part is raised by the lever 52 then the projection 60 and the flange on the hub of the arm 8 serve the purpose, all as will be readily understood.

As in all other apparatuses of this general character, it is necessary to provide means to signal the operator at the central station when the proper coin has been introduced. For this purpose I provide a series of contact devices attached to the arms carrying the coin, and said arms in their return movements after the coin has been carried into the machine are arranged to close this contact and give a suitable electrical signal. Positioned at a suitable point adjacent to these arms is a vertically-disposed shaft 75, upon which are rigidly mounted arms 76, 77, and 78, formed of non-conducting material, which arms are each provided with two terminals to an electrical circuit, which terminals are adapted to be brought together when a genuine coin is introduced and close the circuit, thus causing the predetermined signal to be given. The shaft 75 is adapted, by means which will be presently described, to be swung into position, so that these terminals will be forced into contact by points on the coin-carrying arms (as they return to position) when a genuine coin has been introduced into and accepted by the machine, but to remain out of reach of said points at all other times, including the times when spurious or counterfeit coins have been introduced into the machine and rejected thereby. The signals may be distinguished from each other in any suitable manner—as, for example, by providing a different number of striking-points on each of the several coin-carrying arms.

In the apparatus herein illustrated I have shown a single point on the arm which receives and propels the five-cent pieces or nickels, two points on the arm which receives and propels ten-cent pieces or dimes, and three points on the arm which receives and propels twenty-five-cent pieces or quarters, with the result that a single electrical impulse is given in one case, two impulses in the second, and three impulses in the third, and this of course provides a simple and easy method of sending distinguishable signals.

Upon the bottom of the shaft 75 is a plate 79, having a perforation therein at a proper point. One end of a lever 80 extends over this plate and has a point which engages with the perforation therein, while the other end extends back to below the rod 53. A coiled spring $d$ surrounds the pivot on which the lever 80 is mounted, and this holds its engaging point down into engagement with the perforation in the plate 79, except when it is forced out of such engagement by the rod 53, the weight of which, reinforced by the weight of the part 58, is sufficient to overcome said spring, as well as the springs 66, 67, and 68, as above explained. Extending out from the shaft 75 is a crank-arm 81, from which the connecting-rod 82 runs to a bell-crank lever 83, mounted on a rock-shaft 84. A coiled spring 85 surrounds this rock-shaft and operates reversely to the force of the magnet, (which will presently be described,) with the result that it rocks the shaft 75 to a position which holds the terminals out of the path of the coin-carrying arms and also has a tendency to hold the armature back from the magnet. Another connecting-rod 86 runs from the bell-crank lever 83 to a bar 87, carrying the armature 39 of the magnet 37. A stop 88 alongside the magnet 37 is arranged in the path of the arm 87 and limits its movement when the magnet is energized.

As heretofore stated, the coin-carrying arms are driven from the shaft 62. Rigidly mounted on the lower end of this shaft is a segmental rack 90, and pivoted on said shaft and extending out therefrom is a swinging bar 91, having a stud 92, which engages with a spoke of the segmental rack 90, and is thus adapted to move said rack, and with it the shaft, as it is swung around in one direction. A second stud 93 extends down from the arm 91 into a slot $o$ (formed to receive it) in a reciprocating slide 94, which is adapted to be operated in one direction by a pull-rod 95 and in the other direction by a spring 96. The operation of this apparatus when the pull-rod 95 is drawn out is to wind up a clock mechanism, with the main pinion of which the teeth on the segmental rack 90 engages. Immediately, however, upon the force of the pull-rod 95 being released the spring 96 drives it back to its primary position, and also carries with it the slide 94 and the swinging bar 91. The clockwork then more slowly returns the shaft 62 to its primary position, the stud 92 on the bar 91 having been carried out of contact with the spoke of the rack 90 by the force of the spring 96. The movement of the shaft 62 therefore is a quick movement in one direction under the force applied by the pull-rod 95 and a slower movement in the other direction under the force of a comparatively slow clockwork mechanism.

In order to prevent incomplete movements of this apparatus, and thus prevent the possibility of sending in repeated signals with the introduction of only one coin, I have found it advisable to provide a locking mechanism for the pull-rod, by means of which any movement started is compelled to be completed before any succeeding movement can be begun. A swinging cam-lock 97, mounted on a suitable pivot $z$, is therefore placed alongside the slide 94 and is adapted to engage with and hold said slide from any movement in the opposite direction from that in which it is being regularly moved at any point of its travel, except after it has reached the limit of travel in one direction or the other, so that the movement begun is entirely completed. In order to accomplish this, said slide has two concavities formed in its side adjacent to said locking-cam, one of which is opposite said cam when said slide is at its extreme position in one direction and the other of which is opposite said cam when said slide is at its extreme other position. The end of the locking-cam 97 is rounded, as shown in Fig. 15, and is adapted to enter one or the other of these concavities when the same is in registry therewith, its extreme point being thus within a line coincident with the general boundary of the slide 94, but preferably not in actual engagement with the bottom of the concavity into which it extends. The locking-cam 97 is normally held to the position indicated by the full lines in Fig. 15 by means of the springs $x$ $y$, connected thereto and bearing against stops $u$ on an adjacent stationary part, as will be readily understood, but will swing to one side, as indicated by the dotted lines, when the pull-rod and slide are moved and will there remain until the entire normal movement is completed. If during this movement and before it is completed the pulling force is removed or the pulling operation is suspended and it is attempted in any way to reverse the travel of the parts, the locking-cam will impinge against that portion of the straight side of the slide 94 with which it is at the time in contact and will effectually prevent any such reverse movement, as will be readily understood. The dotted lines in Fig. 15 show the position of the parts after the slide (by means of the pull-rod) has been moved outwardly as far as possible and is returning under the pull of the spring 96 to its at-rest position. In other words, the dotted lines show how this locking-cam serves its principal purpose, which is to prevent a repetition of the signaling indicating the insertion of a coin before the apparatus as a whole has completed its movement after being once operated.

The movement back and forth of the slide 94, as actuated by the pull-rod 95 and the spring 96, is comparatively rapid, while the operation of the clock mechanism driven by the main clock-spring, which is wound up when this slide is moved, is comparatively slow. It is desirable that any further movement of the slide after it has been given any one complete movement shall be prevented until the clockwork mechanism has completed its resultant movement. I have therefore provided a detent 98, which is carried by the pivot $w$ and is held forward into engagement with the notch $n$ in the slide 94 by means of a spring $v$. Said notch $n$ is just at that point where the detent 98 will come into engagement therewith as the slide 94 reaches its inner position. An arm A extends out from the detent 98 and is provided with a hooked end $h$. An arm 99 on a shaft 62 (which, as is elsewhere explained, is driven by the clockwork mechanism) extends out over the arm A and when it reaches the limit of its movement comes in contact with the hook $h$ on the end of said arm, and thus draws the detent back slightly and out of engagement with the notch $n$, as shown in Fig. 15, whereupon the apparatus is ready for another operation. The clockwork mechanism also drives a shaft 100, upon the upper end of which are two cams 101 and 102, which are rigidly connected together. The lower cam 101 operates against a stud 103 on the outer end of a bell-crank lever 104, mounted on a rock-shaft 105, the other end of which carries the terminal 35. The shape of this cam 101 is such that for the greater part of the time the terminal 35 is held back and out of contact with either the terminal 32 or the piece of non-conducting material 31, which is (except when a genuine coin is in the machine) interposed between them, as hereinbefore described. At a certain point, however, the cam permits the bell-crank lever to move forward, which it does under the impulse of a spring 105, and the terminal 35 then strikes the insulated plate 31 or the opposing terminal 32, with the result heretofore explained.

The cam 102 governs the movement of the bar 49. Said bar 49 is pivotally attached to an arm 106, which is rigidly carried by a suitably-mounted pivot-rod 107 and which is actuated by a spring 108 to hold said arm forward, so that the stud 109 thereon is at all times held against the edge of the cam 102. Therefore as the cam 102 is revolved the rod 49 is reciprocated, as will be readily understood, being driven in one direction by the spring 108 and in the other by said cam 102. The spring 108 possesses sufficient power so that as the stud 109 escapes from the cam the rod 49 is driven forward with considerable force and upon striking the cam 44 serves to drive said cam and the rock-shaft 40, upon which it is mounted, around suddenly in one direction or the other, and thus through one of the pairs of arms mounted on said rock-shaft the coin which has been introduced into the machine is driven out in one direction or the other.

As previously stated, the point of the arm 49 is carried to one side or the other of the point of the cam 44, according to whether or not the magnet has been energized by the completion of the electric circuit in which it is included. Said arm 49 is normally held to a position which insures the rejection of a coin by means of a small coil-spring 110, extending from it to the arm 106. The stud 111 on the bell-crank lever 83, however, extends down alongside this arm, and when under the force of the magnets exerted through the lever 87 and push-rod 86 said bell-crank lever 83 is pushed around the bar 49 is thus pushed over, so that it will operate upon the other side of the cam 44. As the magnet is only energized when a genuine current coin has been introduced into the machine it follows that the bar 49 will only operate in this manner at such times.

The clockwork mechanism is carried upon and between two plates 120 and 121, connected by standards 122, and the whole is supported by other standards 123, which extend up from the floor 1. The shaft 100 is mounted in bearings in the plate 121 and in a suitable bracket 124 on the plate 120. A segmentally-formed piece 125, rigidly secured to the plate 120, forms a housing for the portion of the clockwork mechanism which is below said plate and also extends out and forms a bearing for the lower end of the shaft 62. Upon the upper side of this housing 125 is a stop 126, which limits the movement of the segmental rack 90. Said segmental rack engages with a pinion 127 upon the shaft 100, and thus propels said shaft.

As before stated, the cams 101 and 102 are loosely mounted on the upper end of the shaft 100; but just below said cams is a catch 128, rigidly mounted on said shaft, and a pawl 129, carried by the cam 101, Fig. 8, is adapted to engage with said catch, being held forward by an ordinary pawl-spring, as shown. As will be observed, the shaft 100 through the catch 128 is thus adapted to drive the cams in a forward direction only and has no effect on said cams when revolving backwardly. The parts are so proportioned and arranged that pulling out the pull-rod 95 to its full extent winds up the pinion of the clockwork somewhat more than one turn, and consequently the point of the catch 128 passes a little beyond the point of the pawl 129, so that when the forward or running-down motion of the shaft 100 begins there is no motion of the cams until the shaft has moved this fraction of a revolution and the catch has come in contact with the point of the pawl. By this means I insure that the cams will always be moved by the operation of the machine exactly one turn.

Upon the plate 120 is a housing 130, in which is framed the barrel for the clock-spring 131, within which one end of the spring is securely fastened, while the other is secured to the shaft 100. The spring being thus rigidly held by the housing on the framework serves after being wound up and released to drive the shaft 100 and the mechanism actuated therefrom. Just below the housing 130 is a spur gear-wheel 132, which is loosely mounted on the shaft 100. A pawl 134, mounted on the spur gear-wheel 132, is adapted to engage with the ratchet-wheel 133, being held into engagement therewith by a spring 135, also mounted on said spur gear-wheel 132. The spur gear-wheel 132 is in a train of gears leading to an escapement, (which, as best shown in Fig. 9, is or may be of an ordinary form and arrangement,) and thus, as is common in clockwork mechanism, the speed is controlled while the said mechanism is in operation.

As the mainspring 131 is being wound up (by means of the segmental rack 90 engaging with the pinion 127 on the shaft 100) the pawl 134 will slip around on the ratchet-wheel 133, thus permitting the spur gear-wheel 132 and the other mechanism driven thereby to remain at rest; but when the wound up mechanism is released said pawl will engage with said ratchet-wheel and a comparatively slow rotary movement be imparted to the shaft of the clock-spring, causing said spur gear-wheel and said shaft to rotate together, the movement being, as above indicated, controlled by the escapement and being in this particular simply a variety of the well-known train of gears known as "clockwork" mechanism.

As heretofore briefly described, the shaft 75 has rigidly-mounted arms 76, 77, and 78, formed of non-conducting material, and upon each of these arms are terminals of wires to an electric circuit, the wires 140 and 141 of which extend to the central station. When, for example, a nickel has been introduced into the machine, the terminals 144 and 145 will be forced into contact as the point on the arm 8 passes, as clearly indicated by the dotted lines in Fig. 13, said terminals being (by the mechanism described) brought around just into the path of the point of said arm when the coin has been accepted, as above described. When, however, a spurious coin is introduced into the machine, no such result takes place, as in that event the shaft 75 remains in its swung-back position, keeping the terminals out of reach of the coin-carrying arms, as the magnets are in that case prevented from operating, as previously described.

In practice the apparatus embodying my invention is operated in the following manner: A person desiring to use the telephone to which this apparatus is connected will, for example, place a nickel in the mouth $m$ of the coin-receiving projection 5, pressing down on the same until the point of the lever 8, which projects up thereinto, is forced down below the level of said coin-carrying arm. This raises the structure 58 until the projection therein engages with the notch in the flange on the hub of said coin-carrying arm 8 and the apparatus is ready to be operated. The person then pulls out the pull-rod 95 as far as it will go, and this, through the segmental rack 90, winds up the clockwork mechanism. He then releases the pull-rod, which by means of the spring 94 is pulled back to its initial position. The mainspring, through the clockwork mechanism, then drives the various devices in the manner described to dispose of the coin. If genuine, it is accepted, and the proper signal is sent into the central office. If spurious, the coin is rejected, and no signal reaches the central office. The operator is thus enabled to know from the operation of the instrument whether or not proper payment has been made, and consequently whether to make or refuse the desired connection for the telephonic communication. Duplication of signals is prevented by the locking-cam 97, and a repetition of the movement of the pull-rod is prevented by the detent 98 until after the clockwork mechanism, and consequently the coin-selecting apparatus, has fully completed its movement.

Having thus fully described my said invention, what I claim as new, and desire to secure by Letters Patent, is—

1. The combination, in an apparatus for distinguishing genuine from spurious coins for use at an automatic pay-station, of a series of coin-carriers, a shaft upon which the hubs of all of said coin-carriers are mounted said hubs being provided with flanges containing notches, a multiplex engaging device arranged adjacent to said hubs and flanges and provided with projections adapted to engage with the notches in said flanges, and means controlled by the introduction of a coin whereby said multiplex engaging device is raised as a coin is introduced and the projection thereon corresponding to the coin-carrier brought into use thrown into engagement with the flange on the hub thereof, the several projections being so arranged that but one will be brought into engagement at a time, substantially as set forth.

2. The combination, in an apparatus for distinguishing genuine from spurious coins for use at automatic pay-stations, of a coin-receiving mouth, a coin-carrier adapted to enter said mouth and receive the coin therefrom, said coin-carrier having an elongated hub, a shaft therefor passing through said hub and thus supporting said coin-carrier, an external engaging device for engaging with said hub and driving it in one direction, and a spring connected to said hub and tending to force said coin-carrier in the other direction when the last-mentioned engagement is released.

3. The combination, in an apparatus for distinguishing genuine from spurious coins for use at an automatic pay-station, of coin receiving and carrying devices, coin-receiving balancing devices, devices operated from the latter for interrupting or permitting the completion of an electric circuit according to its position, an electric magnet adapted to be energized upon the completion of said circuit, a rock-shaft near the coin-carriers carrying arms bearing contact-terminals for other electric circuits, and a connection from an arm on said shaft to the armature of said electric magnet, whereby said shaft will be rocked and said contact-terminals swung into the path of the coin-carriers when said magnet is energized and said carriers thus caused to send suitable signals over the circuits wherein said terminals are included as they return to initial position.

4. The combination, in an apparatus for distinguishing genuine from spurious coins for use at automatic pay-stations, of a clockwork mechanism, a segmental rack for winding said mechanism, means for driving said segmental rack in one direction, means for immediately carrying the driving device out of contact therewith when released, cams driven by said clockwork mechanism, coin-receiving devices, a circuit-interrupter adapted to be swung to a certain position by a coin-receiving device, connections between one of said cams and said circuit-interrupter whereby at a certain predetermined point in the operation one contact of the circuit is swung toward its fellow, coin-discharging devices, connections between another of said cams and said coin-discharging devices whereby the latter are moved at a point in the operation, and an electric magnet controlled by said circuit-interrupter, whereby the coin-discharging devices are caused to operate in one direction or the other according to the position to which the same is driven, the movement being governed by the weight of the coin introduced into the apparatus.

5. The combination, in an apparatus for distinguishing genuine from spurious coins for use at automatic pay-stations, of swinging coin-carriers, contact-terminals in an electric circuit for signaling to the central office positioned near the coin-carriers and adapted to swing into the path thereof, a means controlled by the weight of the coin introduced for governing the movements of the arms carrying said contact-terminals, whereby said contact-terminals are swung into the path of the carrier when the coin is of proper weight, and permitted to remain out of said path when the coin is different from the proper weight, substantially as set forth.

6. The combination, in an apparatus for distinguishing genuine from spurious coins for use at automatic pay-stations, of coin-balances, coin-ejectors, an electromagnet, a circuit-interrupter for the circuit of said electromagnet, and a connection from the coin-balances to said circuit-interrupter whereby the circuit is permitted to be made when the coins are of proper weight and the coin-ejector thus operated to throw out the coin in one direction, while the interruption of the circuit is maintained when the coin is of a different weight and the coin-ejector thus caused to throw the coin out in another direction.

7. The combination, in an apparatus for distinguishing genuine from spurious coins for use at automatic pay-stations, of a series of coin-carriers for receiving coins of several denominations, a signaling-circuit running to the central office and including contact-terminals arranged near said coin-carriers, and means for swinging said contact-terminals into the path of travel of said coin-carriers when genuine coins are introduced into the machine, said coin-carriers being each provided with a different number of projecting points adapted to come in contact with and operate said contact-terminals, whereby different signals are transmitted, each coin-carrier being thus adapted to transmit a signal comprehending a different number of electric impulses from that transmitted by each of the others, substantially as set forth.

8. The combination, in an apparatus for distinguishing genuine from spurious coins for use at automatic pay-stations, of a series of coin-carriers for receiving and carrying the coins into the apparatus, a shaft on which said coin-carriers are mounted, an exterior multiplex engaging device adapted to make engagement with the hub of each of the coin-carriers respectively, and levers equal in number to the coin-carriers and each having its fulcrum-point differently positioned in respect to its length, which levers extend into the space whereinto the coins are introduced, whereby the multiplex engaging device is raised a different distance for each denomination of coin and the proper coin-carrier thus engaged with and operated while the others are permitted to remain free therefrom and inoperative, substantially as set forth.

9. The combination, in an apparatus for distinguishing genuine from spurious coins, of a clockwork mechanism, a vertical shaft having coin-carriers loosely mounted thereon, a multiplex engaging device surrounding said shaft and provided with engaging points for engaging with the hubs of the coin-carriers, springs whose force is exerted on said coin-carriers oppositely to the movement caused by the shaft, coin-receiving mouths on the outside of the apparatus into which loops on the coin-carriers enter, tables within the machine over which the coins are moved by the coin-carriers and having openings therethrough at the inner ends through which the coins may pass, coin-balances positioned below said openings, a magnet set in an electrical circuit the wires of which have their terminals near each other, a piece of non-conducting material having a hole therethrough arranged to swing between said terminals, and a connection between the frame carrying said non-conducting material and the coin-balances, whereby when a coin of the proper weight is delivered on either of said balances the non-conducting material will swing to a position to permit the circuit-terminals to meet through the opening therein, and when a spurious coin or other object enters will swing to a different position where the non-conducting material will be between the terminals and prevent the closing of the circuit.

10. The combination, in an apparatus for distinguishing genuine from spurious coins for use at automatic pay-stations, of means for carrying the coins into the apparatus, means for automatically ascertaining the weight, a circuit-interrupter governed by said weights, an electromagnet included in the circuit, a force acting oppositely to the pull of the electromagnet on its armature of less strength than said pull, a coin-expelling device, means for actuating the same, and connections between the latter the armature of the electromagnet and the force acting oppositely thereto whereby said coin-expelling device is caused to throw the coin in one direction or the other according to whether the weight of the coin operates the circuit-interrupter to one position or another.

11. The combination, in an apparatus for distinguishing genuine from spurious coins for use at automatic pay-stations, of a clockwork mechanism for operating the coin-selecting devices, and a winding apparatus for the clockwork embodying a reciprocating slide and a cam-locking device mounted alongside said slide and adapted to impinge thereon and prevent it from moving back in either direction until its movement is completed, said slide being formed at points which come opposite said locking-cam when at the end of its stroke in either direction with concavities into which said locking-cam will enter and thereby release the slide for further movement, substantially as set forth.

12. The combination, in an apparatus for distinguishing genuine from spurious coins for use at automatic pay-stations, of a clockwork mechanism adapted to actuate a coin-selecting device, a reciprocating slide whereby the clock mechanism is wound, said slide being provided with two concavities a distance apart equal to its travel, and a locking-cam mounted on a pivot alongside said slide and adapted to stand at substantially right angles therewith when said slide is at its extreme position in either direction—its point at such times extending into the corresponding concavity—said locking-cam being provided with springs whereby it at such times is held in this position and at other times during the movement of the slide held into forcible contact with the flat side of said slide, suitable stops being provided against which the free ends of said springs bear, substantially as shown and described.

13. The combination, in an apparatus for distinguishing genuine from spurious coins for use at automatic pay-stations, of a clockwork mechanism, a reciprocating slide for winding said mechanism provided with a suitable engagement point, a detent adapted to engage with said engagement point after the slide has been fully operated, and a moving part actuated by said clockwork mechanism adapted to engage with and move said detent out of engagement with said slide as the clockwork completes its movement thus releasing said slide for a new operation.

14. The combination, in an apparatus for distinguishing genuine from spurious coins for use at automatic pay-stations, of a clockwork mechanism, a reciprocating slide adapted to wind said mechanism and provided with an engaging point for a detent, a pivoted detent arranged alongside said slide, a spring whereby said detent is held in contact with said slide except when forcibly pulled away from it, and a moving part actuated by the clock mechanism and provided with a swinging arm adapted to come in contact with a suitable extension on said detent and thus move the same reversely to the force of said spring as the movement of the clock mechanism approaches its termination, substantially as set forth.

In witness whereof I have hereunto set my hand and seal at Indianapolis, Indiana, this 14th day of May, A. D. 1901.

JOHN E. EVARD. [L. S.]

Witnesses:
 CHESTER BRADFORD,
 L. H. COLVIN.